United States Patent
Wojciechowski et al.

[11] Patent Number: 6,108,893
[45] Date of Patent: Aug. 29, 2000

[54] FASTENER, DIE BUTTON AND METHOD OF INSTALLING A FASTENER INTO A PANEL

[75] Inventors: Stanley E. Wojciechowski, Canton; Gilbert C. Quick, Jr., Livonia, both of Mich.

[73] Assignee: Fabristeel Products Inc., Southfield, Mich.

[21] Appl. No.: 09/065,371

[22] Filed: Apr. 23, 1998

Related U.S. Application Data
[60] Provisional application No. 60/044,219, Apr. 23, 1997.

[51] Int. Cl.[7] .............................. B21D 39/00; B23D 11/00
[52] U.S. Cl. .............................. 29/505; 29/432.1; 29/509; 411/107; 411/180
[58] Field of Search .............................. 29/509, 515, 505, 29/432.1, 432.2; 411/179, 180, 107

[56] References Cited

U.S. PATENT DOCUMENTS

| | | | |
|---|---|---|---|
| 4,543,701 | 10/1985 | Müller et al. | 29/432 |
| 4,825,527 | 5/1989 | Ladouceur | 29/432 |
| 5,020,950 | 6/1991 | Ladouceur | 411/107 |
| 5,199,837 | 4/1993 | Goss | 411/107 |
| 5,208,974 | 5/1993 | Sawdon et al. | 29/798 |
| 5,340,251 | 8/1994 | Takahashi et al. | 411/179 |
| 5,528,812 | 6/1996 | Muller | 29/432.2 |
| 5,549,430 | 8/1996 | Takahashi et al. | 411/179 |
| 5,752,305 | 5/1998 | Cotterill et al. | 29/432.2 |

*Primary Examiner*—David P. Bryant
*Assistant Examiner*—Jermie E. Cozart
*Attorney, Agent, or Firm*—Howard & Howard

[57] ABSTRACT

The present invention discloses a non-piercing, non-shearing fastener, die button, fastener and panel assembly and method for installing the fastener. The fastener has a head with a flange and barrel which define a retention area and barrel cavity. The retention area receives a portion of the panel and the barrel cavity receives a portion of the panel to lock panel material into the retention area and wrap panel material around the barrel.

8 Claims, 4 Drawing Sheets

FASTENER, DIE BUTTON AND METHOD OF INSTALLING A FASTENER INTO A PANEL

This application claims priority of United States Provisional Application No. 60/044,219, filed Apr. 23, 1997.

BACKGROUND

The present invention relates to the installation of a fastener into a workpiece, such as, for example, a sheet metal panel and in particular, the installation of a fastener into a workpiece without piercing the workpiece.

Typically, fasteners are installed into a panel by piercing the panel with the fastener and plastically deforming the fastener and panel together. The assignee of the present invention has numerous patents to pierce type fasteners, methods for installing such fasteners, die buttons relating to such installation, heads for installing such fasteners, etc. Although pierce type fasteners are very effective in a wide variety of applications, there are some applications that do not benefit from their use. Another method of installing fasteners is by welding the fastener to the panel, a so-called weld nut. This method also poses problems in certain applications.

One example of a "non-pierce" a non-weld type installation is in a pan that is to retain a liquid. A specific example of such a "non-pierce" or non-weld application is the mounting of an air conditioner compressor to the condensation pan of an air conditioner. If the pan is pierced by a pierce type fastener, the pan has to be sealed at the pierce point. This can be done, for example, by using special fluid tight fasteners, separate sealing materials, coatings, etc. However, the use of these alternative methods can be relatively expensive and add to the overall cost of the assembly. With weld nuts, the same problem occurs because the weld nut must be placed in a pre-pierced hole for welding. Weld nuts have further disadvantages as well. They require a longer cycle time than either pierce or non-pierce fasteners, there is a spatter from the weld, heat from the weld can adversely effect the base metal and increase the potential for cracking, they are expensive and have toxicity problems when applied to galvanized materials.

Another "non-pierce" and non-weld type installation is in pre-painted or coated panels. With pre-painted or coated panels, the piercing operation can adversely effect the paint or coating, particularly at the pierce point. The piercing of the panel creates exposed metal that can rust and must be treated to prevent rusting. By using a "non-piercing" fastener, there is no exposed metal and the integrity of the paint or coating is not disturbed. Weld nuts cannot be welded to painted materials rendering them fairly useless unless the surface area is cleared of paint. This would be an expensive, time consuming process which would still have exposed surface area.

BRIEF SUMMARY OF THE INVENTION

The present invention provides a solution to the above disadvantages that occur when using pierce type fasteners in the situations outlined. The present invention discloses a non-pierce type fastener, a die button, a method for attaching the non-pierce fastener to a workpiece, and an assembly having the non-pierce fastener and workpiece to provide a strong assembly without the disadvantages of piercing.

The fastener of the present invention has a connector for connecting the fastener to another member, such as a panel. The connector is disclosed as a threaded shaft that can receive a standard nut. A head is attached to the connector and has a flange that extends generally outwardly and perpendicular to the connector. The flange has a top surface adjacent the connector and a bottom surface. In the disclosed embodiment, the flange is circular, but could be square, hexagonal, octagonal, etc. A barrel extends outwardly from the bottom surface of the flange. The area between the barrel and the bottom surface of the flange define a retention area which is adapted to receive a portion of a work piece, such as, for example, a panel and more particularly, sheet metal, as the fastener is installed into the workpiece. This retention area functions to lock the fastener into the workpiece. The barrel is adapted to be forced against the work piece to plastically deform the portion of the workpiece adjacent the retention area into the retention area to lock the fastener into the workpiece without piercing or shearing the workpiece.

In the preferred embodiment, the barrel is flared outwardly with respect to the longitudinal centerline of the fastener. Preferably, it is flared at a minimum of 20° from vertical. This provides the retention area with an increasing area from the point of intersection of the barrel and flange outwardly. This results in an interlocking effect between the retention area and panel portion inserted into the retention area when viewed in cross-section. The area is generally V-shaped. In use, a portion of the workpiece is packed into this retention area as the fastener is driven into the panel.

The barrel of the preferred embodiment has a flat wide face for contacting the panel surface. This provides a large surface area to engage the panel and not pierce the panel. This surface area also allows the barrel face and the panel to slightly slide relative to one another so that the panel is not sheared by installation forces. The outer edge of the barrel, the edge adjacent to the retention area, is rounded to provide a smooth surface to prevent piercing or shearing of the panel during installation.

The method of attaching the fastener to a workpiece includes the steps of positioning the workpiece between the die button and the fastener and driving the fastener into the workpiece to initially engage the barrel of the fastener against the workpiece and deform the workpiece into the recessed portion of a die button. This places an area of the workpiece in tension. It should be appreciated that the barrel is not deformed during the installation process, unlike pierce type fasteners. The fastener is driven further into the workpiece to thin the workpiece adjacent the barrel. The workpiece is trapped between the barrel outer edge and a transition surface in the die button. Between these two points the workpiece is in tension and stretched.

As the fastener is driven further into the workpiece, the forces on the same portion of the workpiece are reversed from tensile forces to compressive forces which squeezes the workpiece adjacent the retention area and pushes the workpiece into the retention area. This reversal is caused by the workpiece being bottomed into the die cavity and the flange deforming the top surface of the workpiece. As the workpiece bottoms into the die button, the barrel edge is still being driven into the panel which causes the workpiece metal to be pushed around the edge of the barrel. Simultaneously, the flange is deforming the workpiece in the direction of the die bottom causing metal to move in the direction of the bottom and forcing the metal between the edge and the flange to flow into the retention area. The edge of the flange has a rounded corner to prevent piercing or shearing. The transition surface of the die button directs the flowing metal into the retention area and assists in packing it into the retention area. The bottom of the die button assists as well.

The installation process is completed by finally driving the fastener home to lock the fastener into the workpiece.

The barrel has an inner pocket that receives the workpiece as it bows into the pocket when the fastener is finally driven into the workpiece. The die bottom is raised or domed shaped to facilitate the bowing action. This wraps the workpiece around the edge and face of the barrel.

The die button that is used has a top surface with a cavity formed into it. The cavity is defined by an inner wall surface and a bottom surface. The inner wall surface has a transition surface that is generally adjacent the retention area of the fastener. The transition surface is located between the top surface of the die button and the bottom of the cavity. The transition surface allows the panel to be bent and stretched during the initial installation step and then compressed as the installation is completed. In one of the disclosed embodiments of the die button, the wall has a first sloping section that ends at the transition surface and a second sloping section that has a greater slope than the first. This second section terminates in a radiused corner at the bottom of the die button. The other die button which is disclosed has a first sloped section that ends in a generally horizontal intermediate section before the transition surface. The die button is also disclosed with a vent hole to prevent the workpiece from being locked in the die button, for example by hydraulics created during the installation process.

The resulting fastener and panel assembly provides an assembly with good pull-out characteristics and no pierced openings. The assembly includes the fastener having a connector for connecting the fastener to another member and the panel engaging head at one end of the connector with its flange and barrel. The panel has the formed recess into which the fastener is locked. The recess is partially defined by a wall and non-pierced base. The wall has a formed protrusion having a shape generally complementary to the shape of the retention area so that the protrusion generally mates with the retention area and is locked within the retention area.

Other advantages and meritorious features of the present invention will become more fully understood from the following description of the preferred embodiments, the appended claims and the drawings, a brief description of which follows.

DETAILED DESCRIPTION OF THE INVENTION

Figure 1:
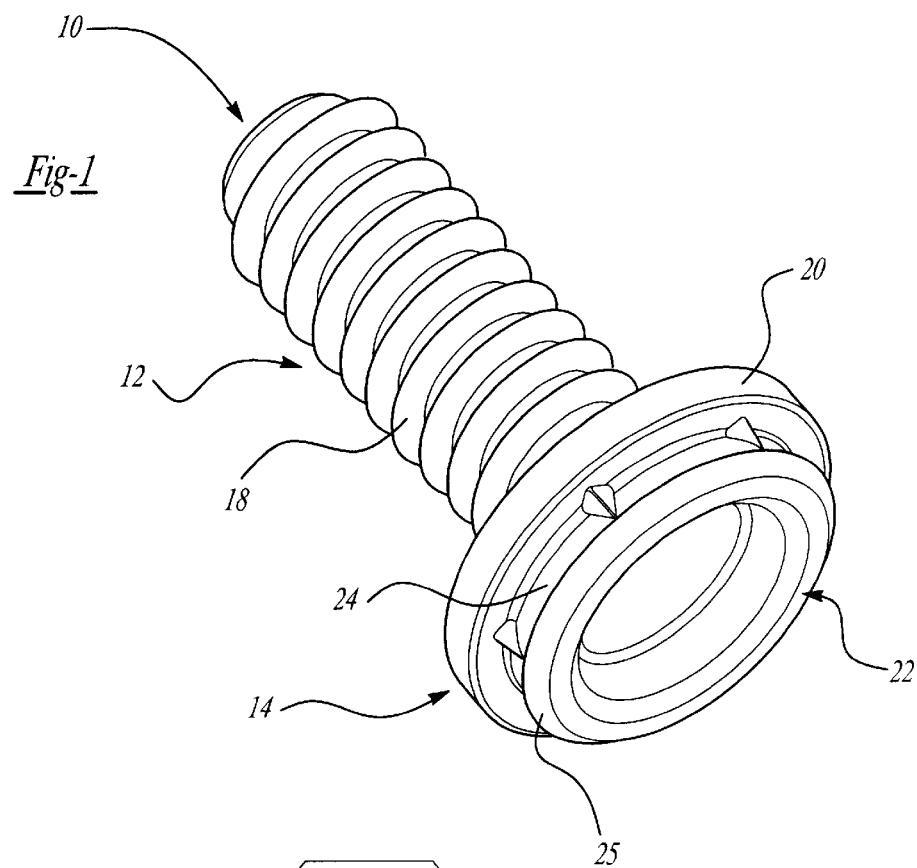
FIG. 1 is a perspective view of the fasteners of the present invention.

With reference to FIG. 1, the fastener of the present invention is illustrated generally at 10. The fastener 10 is illustrated as a stud having a shaft portion 12 and a head portion 14. In the illustrated fastener 10, the stud has a threaded shaft 18. The use of threads and the type of threads will depend upon the application.

The head portion 14 includes a flange 20. In the preferred embodiment, the flange 20 is circular and extends outwardly from the shaft 18 and is generally perpendicular to the longitudinal centerline of the fastener. It will be appreciated that the flange could be square, hexagonal, octagonal or other geometric shape, which shapes will prevent rotation. A barrel 22 extends from the flange 20. The barrel 22 is flared outwardly away from the longitudinal centerline of the fastener and ends in a curved or rounded edge 25 and a contact face 27. In the preferred embodiment, the barrel is sloped at a minimum of 20° from the centerline. The barrel 22 and the flange 20 define a retention access or area 24 between the bottom of the flange 20 and the outer surface of the barrel 22. This retention recess 24 receives the panel and locks the fastener 10 to the panel. This will be discussed in greater detail below.

In the disclosed embodiment, protrusions 16 are provided to prevent rotation of the fastener 10 with respect to the panel after the stud is installed. As indicated above, other anti-rotation means are available.

Figure 9:
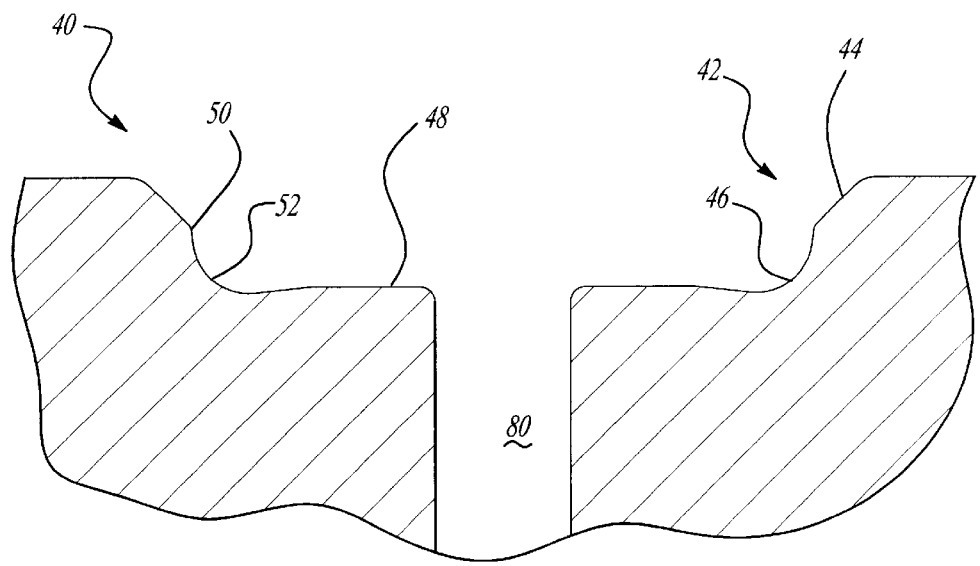
FIG. 9 illustrates the die button of the present invention.

With reference to FIG. 9, one embodiment of the die button of the present invention will be described. The die button is generally shown at 40. The button 40 has a cavity 42 which is defined by an inner wall surface and a bottom surface 48. In the disclosed embodiment, the bottom surface is raised or domed shaped with the highest portion at about the center of the die button. This facilitates the bowing and wrapping of the panel or workpiece. The inner wall surface is defined by a first wall section 44 and a second wall section 46 that are separated by a transition surface 50. As illustrated, the first wall section 44 is sloped but at less the slope than the second wall section 46. It can also be seen that the transition surface 50 is rounded and the intersection of the second wall section 46 and the die bottom surface 48 is a radiused surface 52. The different slopes between wall sections 44 and 46 facilitate the initial stretching of the workpiece 30 and the following compression. The rounded surfaces also facilitate this reversal of the forces applied to the workpiece 30 and are rounded to prevent piercing or shearing of the workpiece 30.

Figure 10:
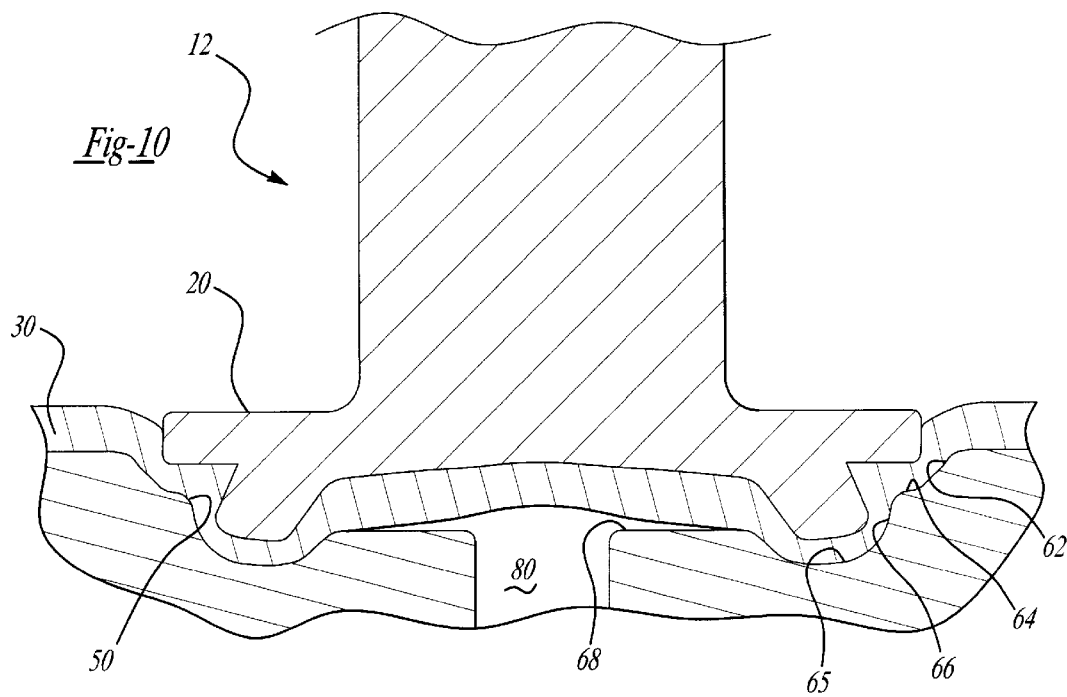
FIG. 10 is a cut away view of a further embodiment of the die button and fastener of the present invention.

In FIG. 10, a further embodiment of the present invention is illustrated. In this embodiment, the inner wall includes another section, a generally flat section 64. In this embodiment, the die button has a cavity 60 that is defined by a sloping wall section 62 that ends in flat section 64. Section 64 ends in the transition region 50 which leads to the third section 66. There is a radiused corner 65 and then the die button bottom surface 68.

This die button also illustrates the use of a central bore 80. This bore 80 is used in the die button to prevent the panel or workpiece from being locked in the die button. Bore 80 prevents hydraulic interaction between the panel or workpiece and the die button so that the panel can be easily removed from the die button.

The installation of the fastener 10 into a panel 30 will be described with reference to FIGS. 2 through 7. It should be appreciated by those of ordinary skill in the art that an installation head having a plunger 31, which is partially shown in FIGS. 2 through 7, is used to install the fastener 10 into a panel 30.

Figure 3:
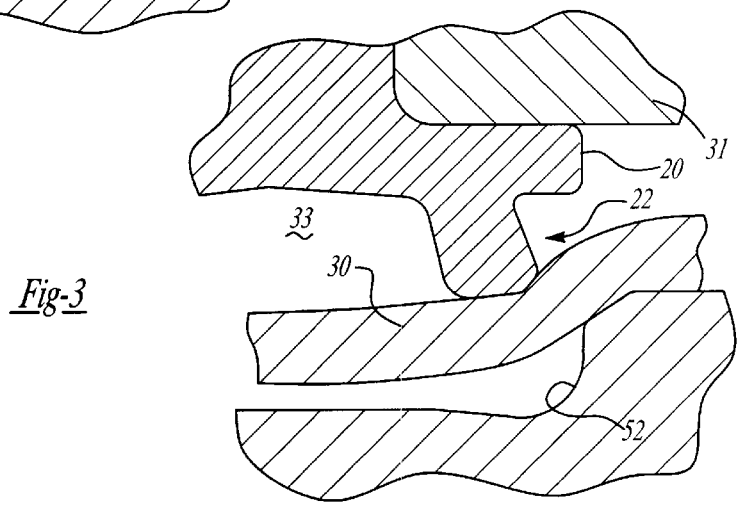
Figure 4:
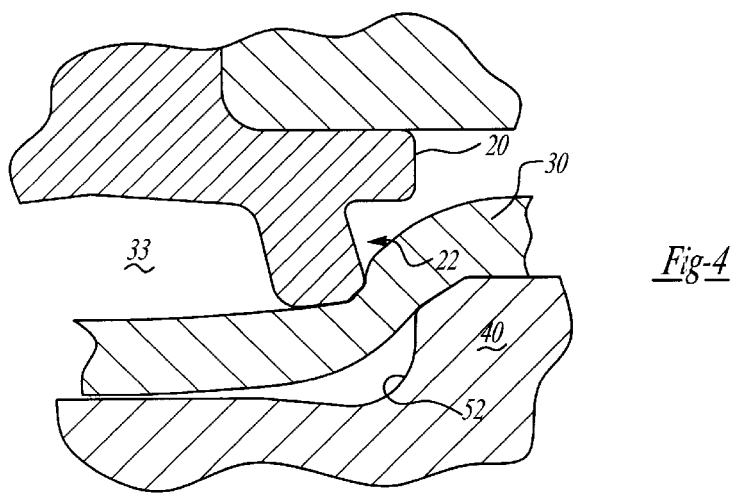

Initially, the face 27 of the barrel 22 contacts the panel 30. As the plunger 31 proceeds through its stroke, the fastener deforms the panel 30 elastically into the cavity 42 of die button 40. The fastener deforms the panel 30 elastically to the point that the load transfer from the outer edge of barrel 22 to the panel 30 begins to plastically deform the panel 30. This is illustrated in FIGS. 3 and 4. The fastener continues to plastically deform the panel 30 thinning the panel in the area of the outer edge 25 of the barrel 22 until the flange 20 contacts the panel 30. At this stage, there is a tensile strain created in the panel. The panel 30 is bent over the transition surface 50 and stretched by the barrel 22.

Figure 5:
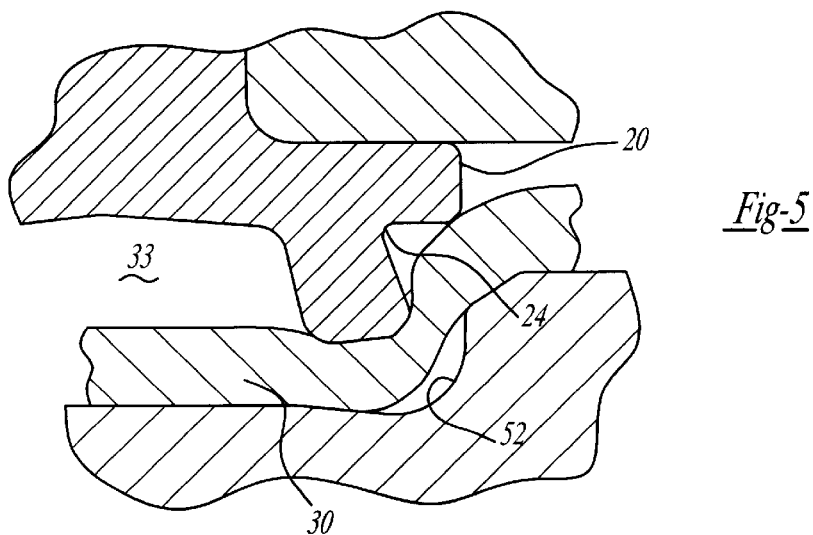
Figure 6:
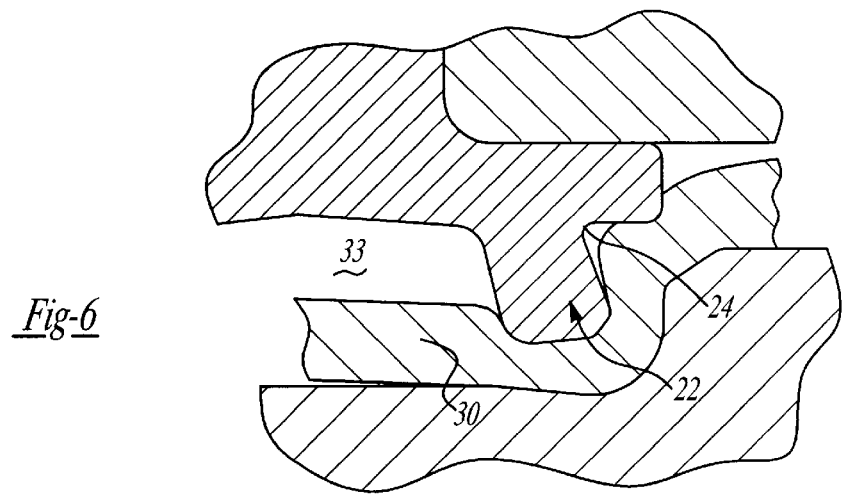

With reference to FIG. 5, flange 20 begins to engage panel 30 and panel 30 has bottomed out on the die bottom 48. The flange 20 from this point to the end of the installation cycle, plastically offsets the sheet steel it comes into contact with forcing material into the retention recess or area 24 and if provided, against the protrusion 16. To prevent piercing or shearing of the workpiece, the edge 49 of flange 20 is rounded. This allows the edge 49 to slide with respect to the workpiece 30. The plastic deformation of the panel 30 caused by the outer edge 25 of the barrel 22 through this segment of the installation cycle reverses the strained condition from tensile to compression. This is shown in FIG. 6. Further as shown in FIG. 6, the barrel 22 is forcing the panel 30 into the corner 52 between the wall 46 and the floor 48. Still further, as shown in FIG. 6, the panel 30 is beginning to be raised into the recess 33 of the barrel 22. During this portion of the installation cycle, metal from panel 30 is being forced down from the flange 20 and up from the barrel 22 to squeeze panel material into retention area 24.

Figure 7:
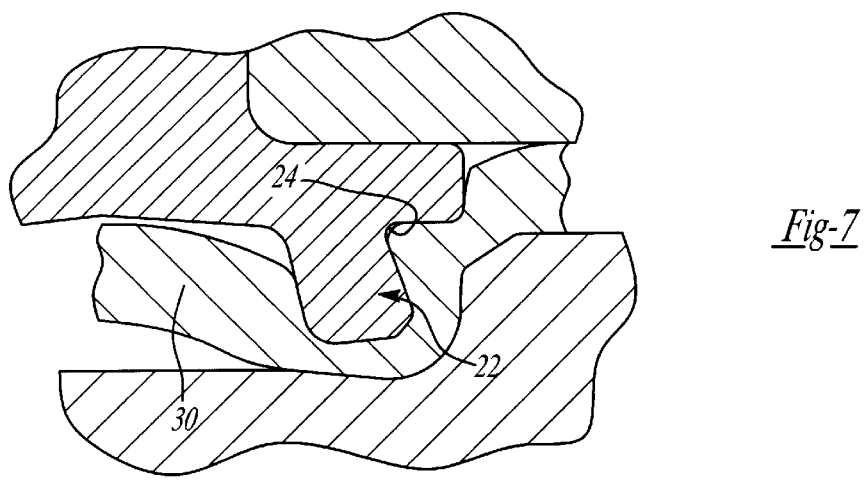

During the final fraction of a millimeter of stroke in the installation cycle, the panel between the face of the barrel and the region 52 of the cavity 42 of die button 40 is plastically displaced radially outward directing additional material around the outer edge of the barrel 22 and into the recess 24 of the fastener 10 ensuring optimum retention fill. This is illustrated in FIG. 7. Additionally, the panel 30 is also raised further into recess 33 to wrap the panel 30 about the barrel 22. The panel 30 is forced to raise by the raised surface of the die bottom 48.

Figure 8:
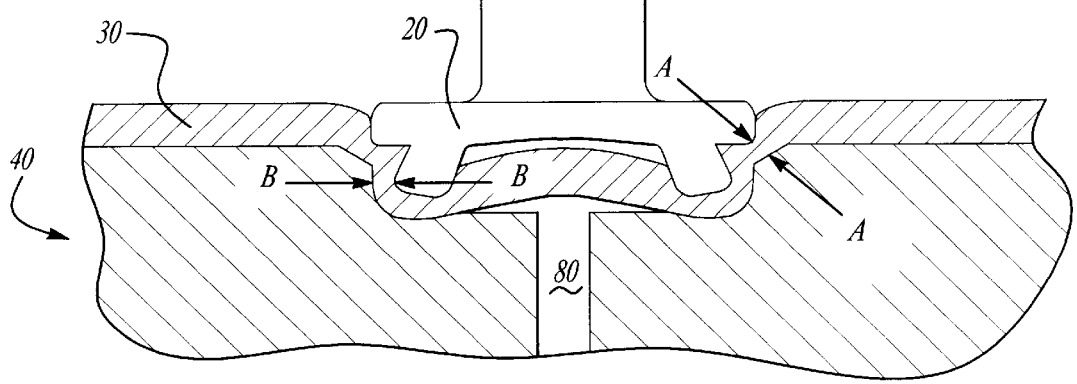
FIG. 8 is a cut away view of the installed fastener, panel, and die button.
Figure 2:
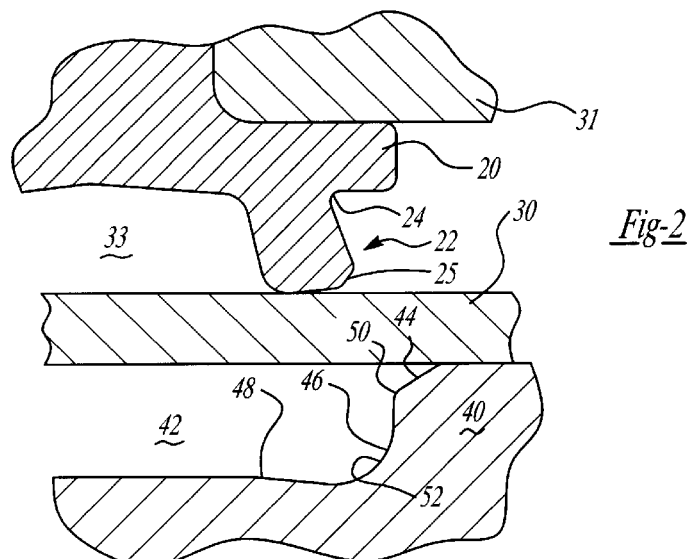
FIGS. 2 through 7 illustrate a cut away view of the fastener and die button of the present invention and the progression of the fastener and the panel as the fastener is installed into the panel material.

It is anticipated that this fastener and method will be used primarily in thin walled panels, such as sheet metal, but other workpieces could be used. It should be appreciated by those of ordinary skill in the art that the dimensions of the die button and fastener will vary depending upon the application. Although the exact dimensions of the fastener, die button and panel will vary, there are some important relationships. The distance between the end of flange 20 and the first wall section 44 should be about one half the thickness of the undisturbed panel 30 when the fastener is attached to the panel. See reference A—A in FIG. 8. Additionally, the distance between the edge 25 should be about one-half the thickness of the undisturbed panel 30 away from wall section 46. See reference B—B in FIG. 8. This sizing compresses metal from the panel into the pocket or area 24.

The foregoing detailed description shows that the preferred embodiments of the present invention are well suited to fulfill the objects of the invention. It is recognized that those skilled in the art may make various modifications or additions to the preferred embodiments chosen herein to illustrate the present invention, without departing from the spirit of the present invention. Accordingly, it is to be understood that the subject matter sought to be afforded protection should be deemed to extend to the subject matter defined in the appended claims, including all equivalents thereof.

What is claimed is:

1. A method for attaching a fastener to a workpiece, said method comprising the steps of:

providing a workpiece;

providing a fastener having a flange and barrel defining a retention area between said flange and barrel;

providing an installation mechanism for driving said fastener into said workpiece without piercing said workpiece;

providing a die button having a recessed portion defined by at least a wall and a bottom for controlling the deformation of said workpiece as said fastener is driven into said workpiece;

inserting a fastener into said installation mechanism;

positioning said workpiece between said die button and said fastener;

driving said fastener into said workpiece without deforming said barrel to initially engage said barrel of said fastener against said workpiece and deform said workpiece into said recessed portion of said die button, placing said workpiece adjacent said barrel in tension;

continuing to drive said fastener against said workpiece to thin said workpiece adjacent said barrel;

driving said flange into said workpiece and reversing forces applied on said workpiece from tensile forces to compressive forces to squeeze said workpiece adjacent said retention area and push said workpiece adjacent said retention area into said retention area;

completing said installation locking said fastener into said workpiece with said barrel not being deformed through method steps and said workpiece not being pierced.

2. The method of claim 1, wherein said step of reversing the forces applied an said workpiece from tensile forces to compressive forces includes the step of driving the flange into said workpiece as said workpiece engages said bottom of said die button.

3. The method of claim 2, further including the steps of providing said barrel with an inner wall, an outer wall and an edge between said inner wall and said outer wall and forcing said barrel into said workpiece to thin said workpiece immediately adjacent said edge of said barrel and force said workpiece between said edge and said flange into said retention cavity.

4. The method of claim 3, further including the step of providing a pocket defined by said barrel and forcing said workpiece to bow into said pocket as said fastener is driven into said workpiece.

5. The method of claim 4, further including the step of forcing said workpiece which is adjacent said edge of said barrel to closely engage said edge and extend along said inner wall and said outer wall.

6. The method of claim 3, further including the step of forcing said workpiece which is adjacent said barrel to closely engage said barrel along said inner wall and said outer wall.

7. The method of claim 1, further including the step of providing a pocket defined by said barrel and forcing said workpiece to bow into said pocket as said fastener is driven into said workpiece.

8. The method of claim 7, further including the step of forcing said workpiece adjacent said barrel around said barrel.

* * * * *